Oct. 25, 1966 R. J. PIOCH 3,280,997
LIFT-DUMP MECHANISM FOR RAM-TYPE
MATERIALS HANDLING APPARATUS

Filed April 27, 1965 10 Sheets-Sheet 1

FIG. 1.

INVENTOR.
Robert J. Pioch
BY
Harness, Dickey & Pierce
ATTORNEYS.

United States Patent Office 3,280,997
Patented Oct. 25, 1966

3,280,997
LIFT-DUMP MECHANISM FOR RAM-TYPE
MATERIALS HANDLING APPARATUS
Robert J. Pioch, 116 Frost St., Jackson, Mich.
Filed Apr. 27, 1965, Ser. No. 451,254
17 Claims. (Cl. 214—302)

The present invention relates to apparatus for handling containerized material, and particularly to improved means for discharging the contents of open-topped receptacles by lifting and inverting them at a desired destination.

An important object of the invention is to provide improved lift-dump means arranged to cooperate with a hopper or receiving portion and with an associated ram-type propelling agency for the dumped material and wherein the lift-dump means is so arranged and interrelated to the ram mechanism that receptacles may be lifted and dumped automatically in timed relation to the ram without the requirement for separate actuation, and the parts of which are so arranged that the lifting and dumping means does not interfere with free access to the area or receiver into which the material is dumped.

A related object is to provide improved automatic means for interlocking the lift-dump mechanism with the receptacles during lifting and inverting of the latter.

A further object is to provide an apparatus of the indicated character which is simple, rugged and reliable in character and which requires less power in proportion to the load to be handled than other mechanisms heretofore used.

Other objects and advantages will be apparent upon consideration of the present disclosure in its entirety.

In the drawing:

FIGURE 5 is a similar perspective view showing the receptacle in the full dumping position;

FIGURE 7 is a longitudinal sectional view of the lift bar;

FIGURE 13 is a perspective view, partly broken away, of the modified lift-dump mechanism with the lifting means in lowered position;

Figure 1:
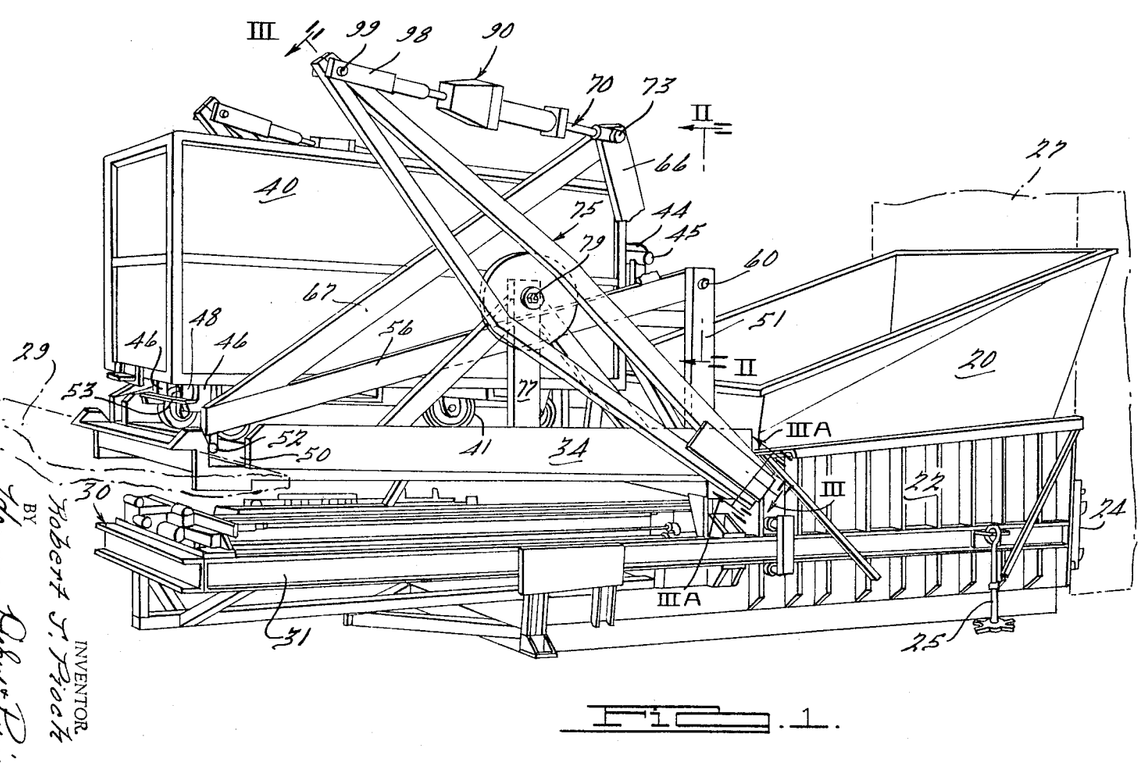
FIGURE 1 is a perspective view of a preferred embodiment of my invention showing a receptacle in position ready for lifting and dumping of its contents.

Referring now to the drawing, my improved lift-dump mechanism is adapted to be employed in conjunction with compacting apparatus of the character disclosed in my copending application, Serial No. 294,607, filed July 12, 1963, now Patent No. 3,250,414, granted May 10, 1966. Such compacting apparatus includes a flared receiving hopper such as is shown at 20 in FIGURE 1 hereof, into which material to be compacted is dumped and the bottom of which opens into a box-like chamber 22 having closed side walls and open front and rear walls. A piston-like ram 24 of rectangular cross section is movable through the chamber 22 and through the front and rear walls thereof, from a retracted position whereat it forms in effect, the left or rear end wall of chamber 22 (as viewed in FIGURES 1 and 5 hereof) to a projected position wherein it lies beyond or to the right of the right or front end wall, as shown in FIGURE 1. As brought out in the aforementioned copending application, a large reinforced container is adapted to be firmly grappled to the chamber 22, as by the connecting means 25, in such manner as to cover the front wall of the compacting unit. The positioning of such a container is indicated in dotted lines at 27. The container has an opening which is somewhat larger than and aligned with the ram 24 so that actuation of the latter in the manner described is effective to force any material within chamber 22 into, and compact it within, the container 27. The ram 24, which is shown fully projected in FIGURE 1, is visible at the right end of that view, but it will be understood that when the container is in position attached to and adapted to receive material from the compacting chamber 22, the ram 24 is not visible because, although it is in the same position, its forward end is concealed within the container. The ram ordinarily stands in such forward position when the compacting mechanism is idle, thereby forming a closure for the opening in the container and also acting, if the container is full or substantially so, to maintain the contents under compaction.

A portion of the frame structure 30 of the compaction chamber 22 including the side rails 34 extends rearwardly to provide a slideway for the ram. An access floor or platform 35 which forms a way of access to the hopper is positioned directly over the frame 30 and is supported at its forward end by the frame structure 30, and at its rear end is adapted to overhang and be supported by a shipping dock 29. It will be understood, however, that other supporting structural arrangements may be used. The side frame members for the platform 35 are designated 34. The frame 30 not only supports and guides the ram, but also the actuating hydraulic cylinder means for the ram, and other parts, as brought out in the aforementioned copending application and as has now become known in the art. As also brought out more fully in such prior application, the floor 35 forms an outward extension of the shipping dock or other platform as 29 so that waste material may be delivered to the hopper 20, the floor and associate structure having overhanging supporting portions 31 adapted to rest upon the edge of the dock.

Figure 4:
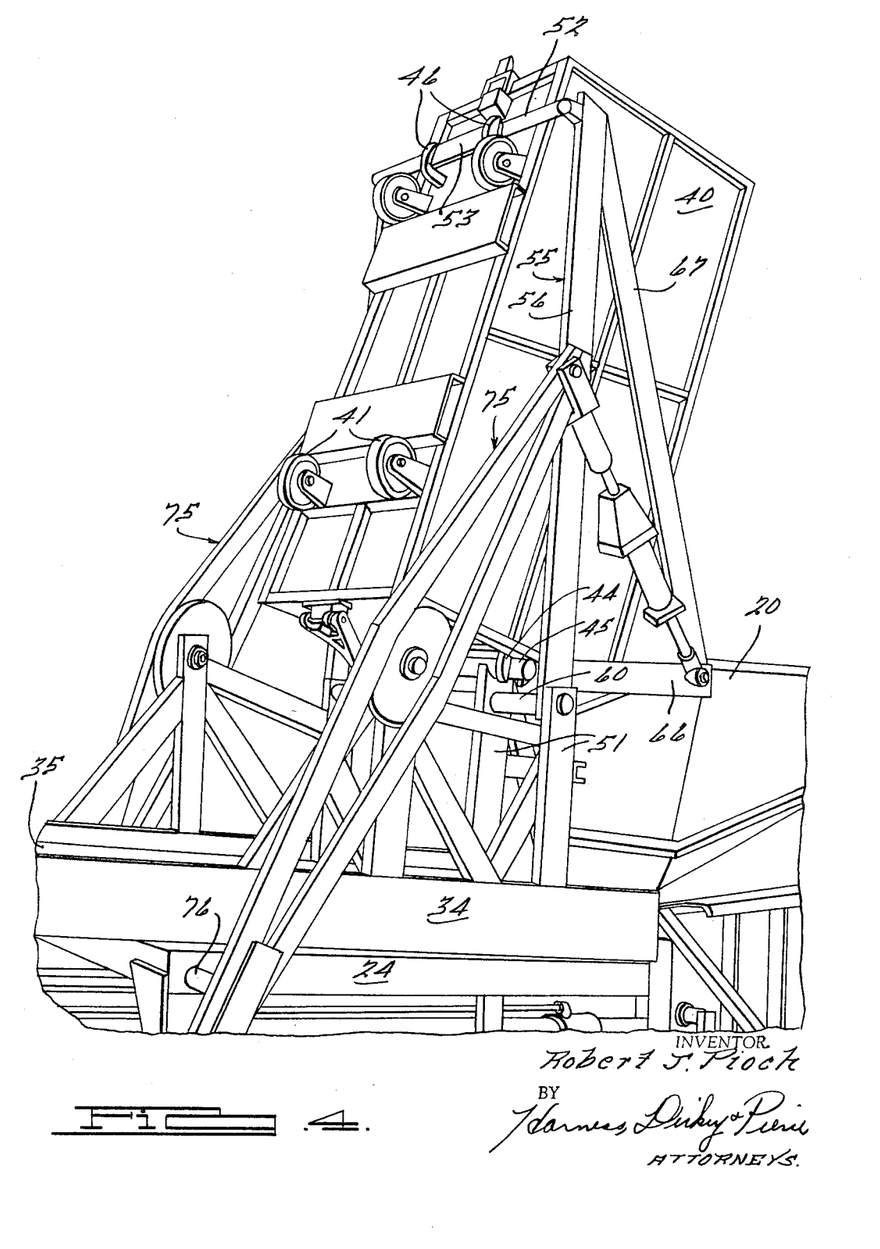
FIGURE 4 is a perspective view of the lift-dump apparatus and an associated receptacle in an intermediate partly elevated position.

As brought out in FIGURES 1, 4 and 5, the improved lift-dump means of the present invention in adapted to handle loads having contents to be dumped, such as rectangular open-topped box-like receptacles, as 40, which may be provided with caster wheels as 41. The floor and walls of the receptacles may be formed of generally flat but suitably reinforced sheet metal panels. The front wall, designated 42, is provided, near each side, with laterally spaced pivot brackets 44, one of which is located near each side of and projecting forwardly from the receptacle. Such brackets, designated 44 may comprise kerfed plates lying in a vertical plane and rigidly attached as by welding to the front of the receptacle. The brackets 44 are transversely aligned and are installed at a uniform height and position on all receptacles in such manner as to form in effect a slot-like opening having its open end directed forwardly.

When the receptacle is pushed forwardly to a position at the front of the platform the upper and lower portions of the brackets 44 closely overlie and underlie a transverse pivot bar 45 rigidly carried by an upright frame structure 51 secured to and projecting upwardly from the platform frame members 34 and positioned horizontally at a height above the floor 35 corresponding to the height of the opening between the arms of the kerfed brackets 44. Bar 45 is positioned close to the rear wall of the hopper 20 at the forward end of the floor 35. The brackets 44 and bar 45 also constitute locating abutments for the receptacle 40, so that the receptacle is automatically properly located when pushed forwardly until stopped by the interengagement of these parts.

The lift-dump means also includes means engageable with a rear lower portion of the receptacle in such manner as to swing the entire receptacle upwardly and forwardly around the axis of bar 45 as a fulcrum and to an inverted position, as progressively illustrated in FIGURES 1, 4 and 5, and then return it in the reverse sequence rearwardly and downwardly to the position of FIGURE 1.

Each of the receptacles 40 is provided at a rear lower portion thereof with rearwardly facing slot-like openings defined by a pair of hook-like plates 46. The plates 46 are also installed upon all receptacles in a uniform manner and at a uniform distance from plates 44, and as shown may comprise heavy gauge sheet metal members welded or otherwise firmly attached to and depending from the bottom of the floor and projecting rearwardly therebeneath at a position behind the rear wheels. The rearwardly projecting portions of the plates 46 cooperate with the flat floor structure to define rearwardly facing slot-like openings 48 located at a position such that when the receptacle is in the ready position shown in FIGURE 1, the opening portions 48 are close to, but slightly forwardly of a transverse trough 50 in and extending entirely across the floor 35.

Figures 2, 3, 3A:
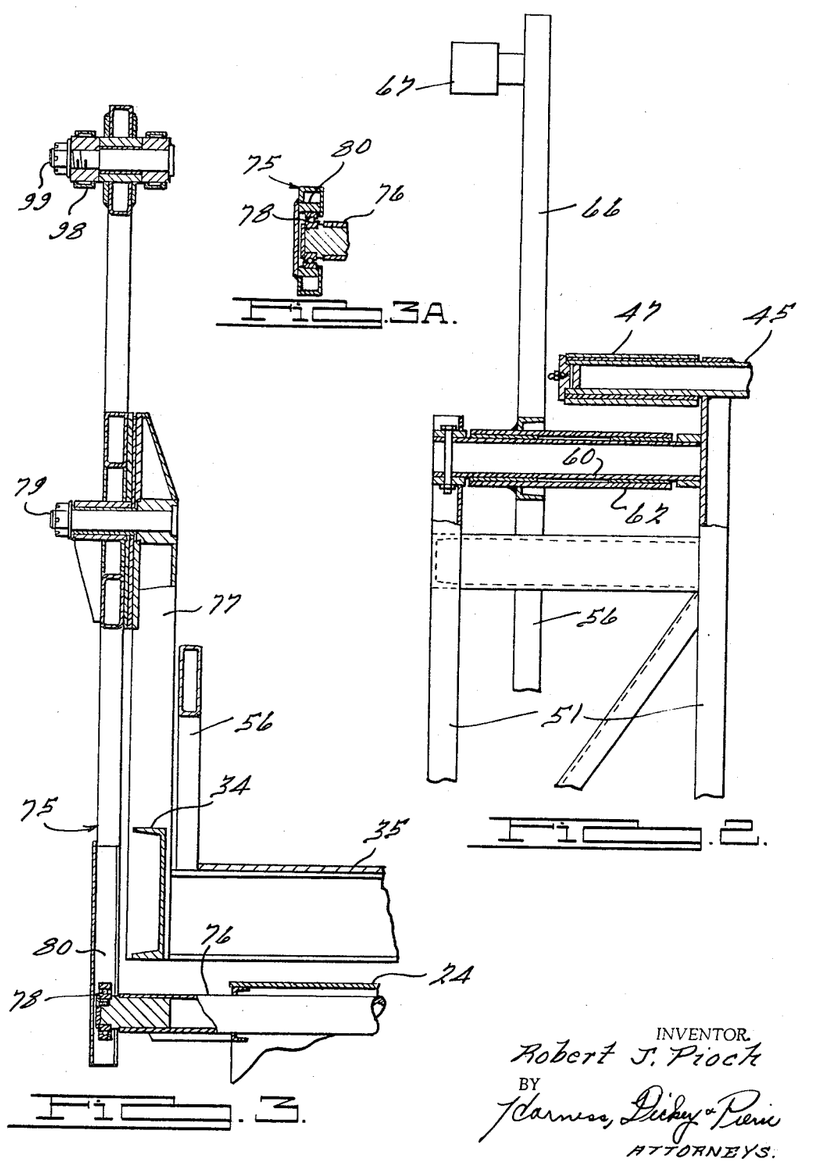
FIGURE 2 is a cross section taken substantially on the line II—II of FIGURE 1 and looking in the direction of the arrows.
FIGURES 3 and 3A are cross sectional views taken substantially on the lines III—III and IIIA—IIIA respectively, of FIGURE 1, and looking in the direction of the arrows.

Trough 50 defines a recess for a lifting bar 52 attached to and actuatably by a pair of opposed elevator or lifting arms 56. The elevator arms 56 are disposed at opposite sides of the platform and swing in vertical planes. The other components of the lifting mechanism except for the bar 52 also lie at the sides and are arranged in vertical planes so as to occupy a minimum of useful space and to present no interference with the use of the platform and access to the hopper. The lifting components on the two sides are alike, so that description of the components on one side will suffice. The bar 52 is welded to the rear extremities of the arms 56, such arms being swingable in parallel relation and as a unit with bar 52 about a common transverse axis which is located a few inches below and parallel to the axis of pivot bar 45. Such axis of pivotal movement of the arms 56 is defined by a pair of tubular members 60 carried by the front frame structure 51 which also supports the pivot bar 45 for the receptacles. As brought out in FIGURE 2, the arms 56 are rigidly attached to sleeve portions 62 which are journaled on the transverse tube elements 60. It is also preferred to provide on the portions of the pivot bar 45 engaged by the brackets 44 a journaled sleeve 47 freely rotatable on the bar 45 in order to reduce sliding friction and wear as the receptacles are tilted.

Each of the arms 56 forms one arm of a bell crank generally designated 55, the second arm 66 of the bell crank extending perpendicularly to the arm 56 and being rigidly interconnected therewith by an angular brace 67 welded at its ends to the extremities of the arms 56, 66. When the lifting bar 52 lies in the trough 50, the lifting arms 56 extend angularly upwardly and forwardly from the trough to the fulcrum at the pivot tube 60, while the actuating arms 66 extend upwardly more nearly vertically.

The upper extremity of each arm 66 is pivotally connected by a link assembly generally designated 70 to the upper arm of one of a pair of main levers generally designated 75. The parallel opposed main levers 75 are pivoted approximately midway of their length upon a common transverse axis 79 in a side frame supporting structure 77 which is secured to and extends upwardly from the side frame portion 34. The upper end of each lever 75 is pivotally connected to its link assembly 70, while the other, lower end of the lever 75 is actuatable by the ram 24. As shown in FIGURE 1, when the receptacle is in its initial position the lever 75 extends angularly upwardly and rearwardly from its connection at the rear end of the ram 24. At its rear upper corners the ram carries transversely projecting tubular supports 76 having at their extremities antifriction rollers 78 which are interfitted with and rollable along channel portions 80 carried by and extending longitudnally of the lower arms of levers 75.

As the ram moves rearwardly, the rollers 78 rock the levers 75 clockwise, as viewed in FIGURE 1, from the position shown in FIGURE 1 to that shown in FIGURE 5, which latter position is reached at full retraction of the ram. In the initial positioning of the levers 75 with respect to the rollers 78 and during the initial portion of the rearward motion of the ram, the angular relationship between the path of the ram-carried rollers 78 and the channels 80 in the levers 75 is such that the rollers exert a camming action upon the levers giving a torque multiplying effect and slower, smoother initial pickup during this portion when the greatest lifting effort is required. During initial movement of the levers the bar 52 is lifted upwardly against the bottom of the floor of the receptacle, which it engages at a position directly behind the openings 48 defined by the hooks 46. As the receptacle is lifted, and pivots about the axis defined by bar 45, the bar 52 describes an orbit about the axis of the supporting tubes 60. Bar 52 is both slidable and rockable with respect to the receptacle. Since the axis at fulcrum tubes 60 is spaced below the axis at fulcrum bar 45, the orbit of bar 52 converges toward the orbit of the hooks 46 as the receptacle is moved upwardly and forwardly by the bar. Bar 52 accordingly moves into the openings 48, as shown in FIGURE 4, before the receptacle reaches an overbalanced position. The movement continues until the receptacle is tipped over to an angle which insures discharge of its contents by gravity. This does not necessitate swinging the parts far enough to cause the bar 52 to disengage from the overhanging portions of the hooks 46 and the hooks 46 thus support the inverted receptacle on the bar 52, while the other end of the receptacle is at such time supported by the kerfed plate members 44. In commercial apparatus constructed as herein disclosed the straight line distance between the centers of hooks 44 and the axis at 48 in hooks 46, measured perpendicularly to the axis of tube 45, is 80¼", while the effective radial length of arms 56 is 87", that is, the radius of the orbit of bar 52. Bar 45 and hooks 44 are 40" above the floor line, while the axis of lift arms 56 at tube 60 is 34" above the floor line. The hooks 46 have an effective internal length of 6". The bar 52 is effectively engaged in the hooks 46 before the receptable has been tilted upwardly 45°. Due to the fact that the axis at bar 60 is at a high postion while the lifting axis at 48 is at a low position, the receptacle is tilted more than the arms 56, and the receptacle is therefore effectively inverted (FIGURE 5 position) without requiring arms 56 to move downwardly over the hopper far enough to eliminate good inter-engagement between the bar 52 and hooks 46. The supporting portions of hooks 46 are preferably bridged by a plate 53 in order to distribute the load on bar 52.

When after dumping (which is completed at full retraction of the ram) the ram commences its forward travel, the side arms 56 are swung in the opposite, counterclockwise direction, as viewed in FIGURES 1, 4 and 5, to return the receptacle to the lowered position shown in FIGURE 1, the bar becoming disengaged from hooks 46 as the receptacle nears the floor and the bar 52 thereafter continuing downwardly into the trough 50 so that it presents no obstacle to movement of the receptacle off the platform 35.

A hydraulic dashpot-type cushioning assembly generally designated 90 is preferably incorporated in each link assembly 70. The cushioning assembly consists of a reservoir 92, a cylinder 94 rigidly coaxially secured to the reservoir 92, and a piston 95 slidable in the cylinder 94. Rod 71 articulated at pivot pin 73 to the end of bell crank arm 66 carries at its left end, as viewed in FIGURE 6, the piston 95. At its left end the oil reservoir is secured by a rod assembly 96, 97 of adjustable length, to a clevis portion 98 articulated at 99 to the upper end of the lever arm 75. The cylinder space to the left of piston 95 is connected to the interior of the reservoir 92 through a check-type adjustable orifice restriction valve 101, while the cylinder space to the right of the piston 95 is similarly connected to the reservoir through a similar independently adjustable restriction valve 102. Each valve provides an adjustable degree of restriction of flow from the cylinder to the reservoir, but does not restrict flow of the cylinder. The complete assembly of dash pot structure and rods, collectively designated 70, thus provides a cushioning type link on each side which extensible and contractible in length at a rate controllable in proportion to the applied forces by adjustment of the throttling effect of the valves 101, 102.

When the ram is in the forward position and the lifting bar 52 is lowered, as in FIGURE 1, the pistons and rods are pulled outwardly to substantially their full length. As the ram commences its rearward travel, liquid is forced into the reservoirs from the left sides of the pistons 95 at a controlled rate and from the reservoirs to the right sides of the pistons. The load is picked up gradually and in a cushioned manner due to the restrictive effect and the adjustment is preferably such that before the receptacle reaches the vertical position, the link assembly is fully compressed. When the receptacle moves to an overbalanced position so that gravity tends to move the receptacle downwardly toward the final dumping position of FIGURE 5, tension is thereby exerted upon the link assembly, again drawing out the rods 71, at a controlled rate and thereby cushioning the final movement of the receptacle, and permitting it to descend farther than would otherwise be possible in proportion to the angular displacement of levers 75.

Figures 6, 8, 11, 12:
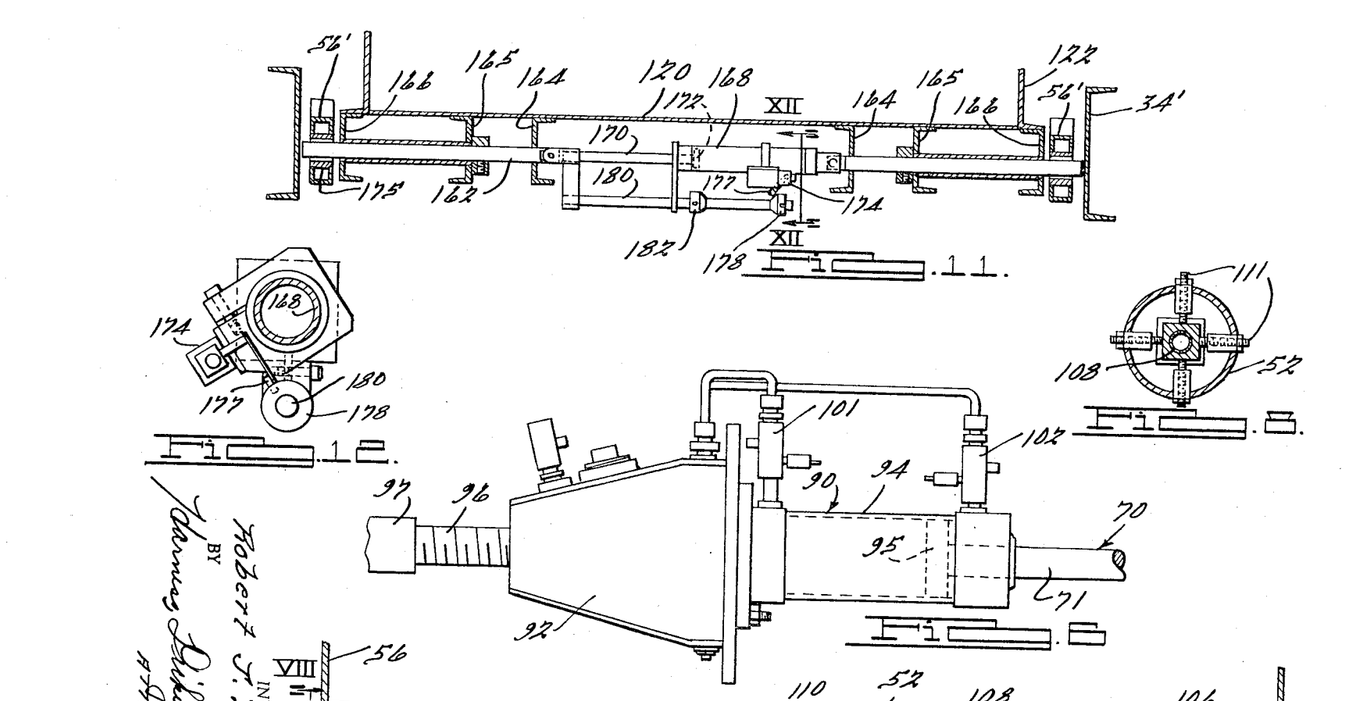
FIGURE 6 is a longitudinal sectional elevational view of the hydraulic cushioning means for the actuating links.
FIGURE 8 is a cross sectional taken on the line VIII—VIII of FIGURE 7 and looking in the direction of the arrows.
FIGURES 10 and 11 are sectional elevational views taken substantially on the lines X—X and XI—XI of FIGURE 9 and looking in the direction of the arrows.
FIGURE 12 is a sectional detail taken substantially on the line XII—XII of FIGURE 11 and looking in the direction of the arrows.

The lifting bar 52 is preferably provided with means for stopping movement of the parts before sufficient force could be applied to the bar to impart a permanent deformation. Bar 52 comprises a heavy-walled cylindrical tube or pipe rigidly attached as by welding to the arms 56. Within and near one end of tube 52 is an electrical limit switch 105 having a rod-like actuating arm 106 which extends axially inwardly from the limit switch for a few inches coaxially within and toward the midportion of tube 52. The switch mechanism (not shown) is of a well-known commercial design which is so arranged that the switch is actuated in response to relatively slight swinging movement of the arm 106 in any angular direction with respect to its axis. Spacedly within the tube 52 is a smaller coaxial tube 108 having an internal diameter which substantially exceeds the diameter of arm 106 while its external diameter is substantially less than the internal diameter of tube 52. A midportion of the actuating tube 108 is supported within tube 52 by an axially apertured supporting plate 110. The fit of tube 108 in the aperture in plate 110 is close but loose enough to permit rocking of tube 108 within tube 52 on plate 110 as a fulcrum. At is left end, as viewed in FIGURE 7, tube 108 is fixed with respect to tube 52 in such position that when bar 52 is straight, the right end of tube 108 substantially concentricaly surrounds and does not engage the arm 106. It will be seen that if bar 52 is bowed, the relative transaxial movement of plate 110 with respect to the secured left end of tube 108 and bar 52 will cause a multiplied transverse relative movement between the right ends of tubes 52, 108 and that if such movement exceeds a predetermined value the right end of tube 108 will engage and actuate the switch arm 106, thereby tripping the switch. The switch 105 is connected by suitable circuitry (not illustrated) to disable the ram and stop the mechanism when the bar is distorted, in such manner, beyond the designed limits. Thus if there were a receptacle in a wrong position, or any other obstruction which might cause harmful forces to be exerted upon the bar, the system is stopped, so that the ram can be reversed and the obstruction cleared before damage could occur. As also shown in FIGURE 8, the connection between the left ends of tubes 52, 108 may be effected by threadedly adjustable radial abutment screws as 111, to permit convenient centering of the parts in a desired initial positioning.

In the modified construction shown in FIGURES 9–14, inclusive, many of the parts will be recognized as the same as or basically similar to those already described in connection with the first embodiment. Such parts are designated by similar reference characters primed, and will require no redescription. In this modification no special fittings or special configurations of any character are required upon the receptacles. The receptacles may comprise simple open-topped boxes, 40', which may be delivered to the lift dump mechanism upon their own casters or in any desired manner. The side frame portions 34' of this embodiment of the invention similarly carry the main levers 75' by means of uprights 77', but there is no fixed platform floor corresponding to platform floor 35 of the first embodiment. Instead a platform 120 forms a floor which, in place of the stationary floor 35 of the previous embodiment, moves with the lifting arms 56' when a receptacle is to be dumped. Thus when the lifting arms are actuated upwardly and forwardly, in a manner similar to the first embodiment, the receptacle rests upon and is elevated by the platform 120. As brought out in FIGURE 14, the platform structure includes side platform frame members 122 which are rigidly interconnected by cross bracing rails 121 beneath the platform floor 120.

The platform structure is swingable upon a pivot bar 60' carried in a supporting frame srtucture 51'. In this embodiment the lifting arms 56' are swingable about the same pivot axis as the platform, comprising the axis of the bar 60'.

Figures 10, 11:
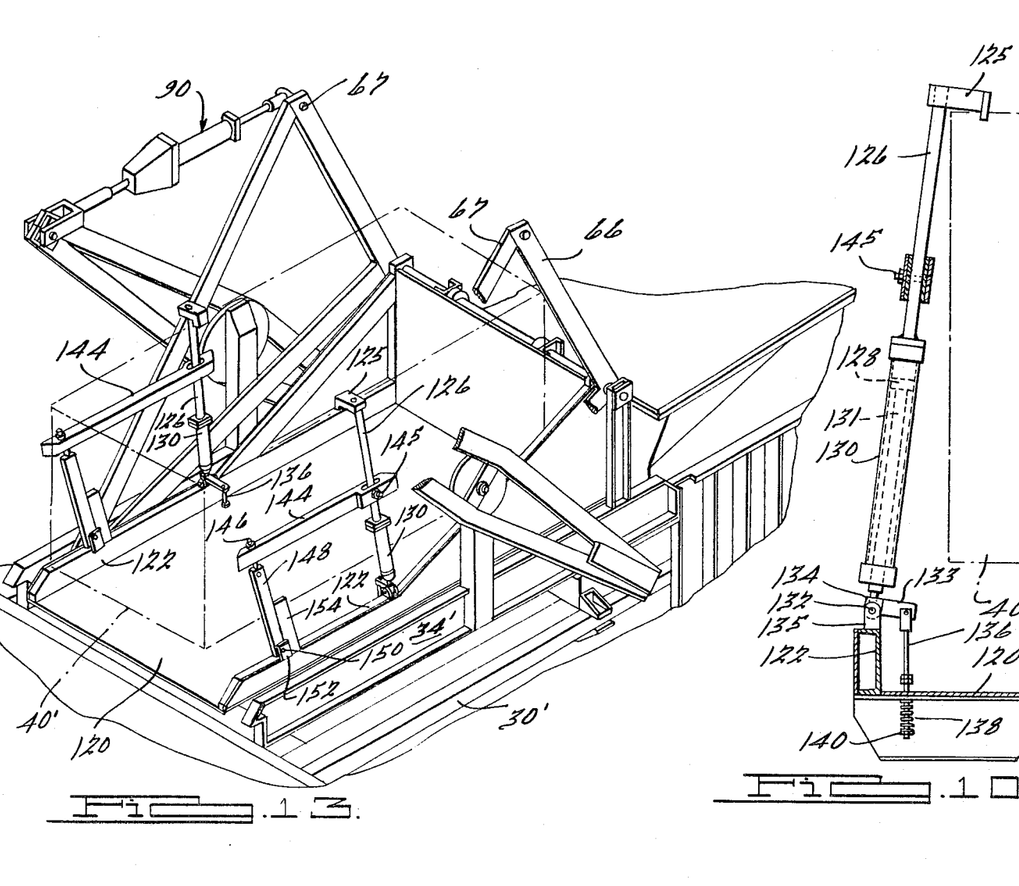

The receptacles are adapted to be releasably secured to the platform structure by downwardly directed hook-like clamping portions 125 which are hydraulically actuatable and adapted to over-engage and to be drawn downwardly against the tops of opposite sides of the receptacle, two such clamping portions 125 being provided, one carried on each of the side rails 122 of the platform structure. As best shown in FIGURE 10, each of the clamping hooks 125 is attached to the top of a rod 126 attached to the upper end of a cylinder 130. A piston 128 in each of the cylinders 130 is attached to a piston rod 131 which extends through the lower end of the cylinder in each instance and is attached to the top of the adjacent side frame member 122 of the platform structure by means of a coupling 134, support 135 and pivot pin 132. Pin 132 extends fore and aft of the platform, in such manner that the entire cylinder and the rod 126 and hook portion 125 carried thereby may rock about the axis of pin 132 so that the hook portion 125 may be moved laterally to and from overhanging relationship to the receptacle 40'. An arm 133 projects rigidly inwardly from the coupling portion 134 to which the cylinder 130 is attached and rocks with the cylinder and rod assembly about the support 135 attached to frame member 122. A rod 136 attached to the inner end of arm 133 extends freely downwardly through a hole in the floor 120 and a compression spring 138 on the rod 136 beneath the floor bears downwardly against an abutment washer 140 secured on the lower end of rod 136 and upwardly against the floor so that under the influence of spring 138 the hook portion 125 is yieldably urged inwardly to overhanging position with respect to the side wall of a receptacle positioned upon the platform. The arms 133 and rods 136 are spaced apart a distance exceeding the width of the receptacles or carts for which the platform is adapted, and means are provided to guide the carts or receptacles into proper position between the hooks 125 and to spread the hooks apart to the proper distance, such means being shown as comprising skid-like guide rails 144. Each rail 144 is connected at its rear end to the extension rod 126 of the pull-down cylinder in such manner as to move laterally therewith but to pivot in a vertical plane about their connecting pin 145. Rails 144 extend forwardly substantially parallel to and above one of the platform side rails 122 to a position near the front or dock end of the platform, where each rail 144 is loosely connected as by a rockable eyebolt 146 to the upper end of an upright support 148. Each support 148 is pivoted on a transverse axis at its lower end for limited rocking movement in a fore and aft direction upon a pivot pin 150 carried in bracket means 152 secured to the rail 122. A second upright 154 is rigidly attached at its lower end to side rail 122 and extends upwardly along the rear of upright 148 to a lesser height and is connected at its upper end to the upright 148 by means of a rod 155 which extends loosely through both of these members and which carries a spring 156 thereon arranged to permit limited swinging movement of upright 148 forwardly away from rigid upright 154 about pivot pin 150.

When hydraulic fluid is forced into cylinders 130 below pistons 128 the cylinder and attached hooks 125 are thereby drawn downwardly with respect to the fixed piston and rod assembly 128–130, to clamp the cart or receptacle. The forward ends of the guide rails 144 also move downwardly and the pivoted connections provided by the rockable connections at positions 145, 146, 150, permit movement of these members with respect to each other, and it will also be appreciated that the movability of these parts prevents damage in event they are struck by the receptacles during movement of the latter onto and off of the platform.

Figure 14:
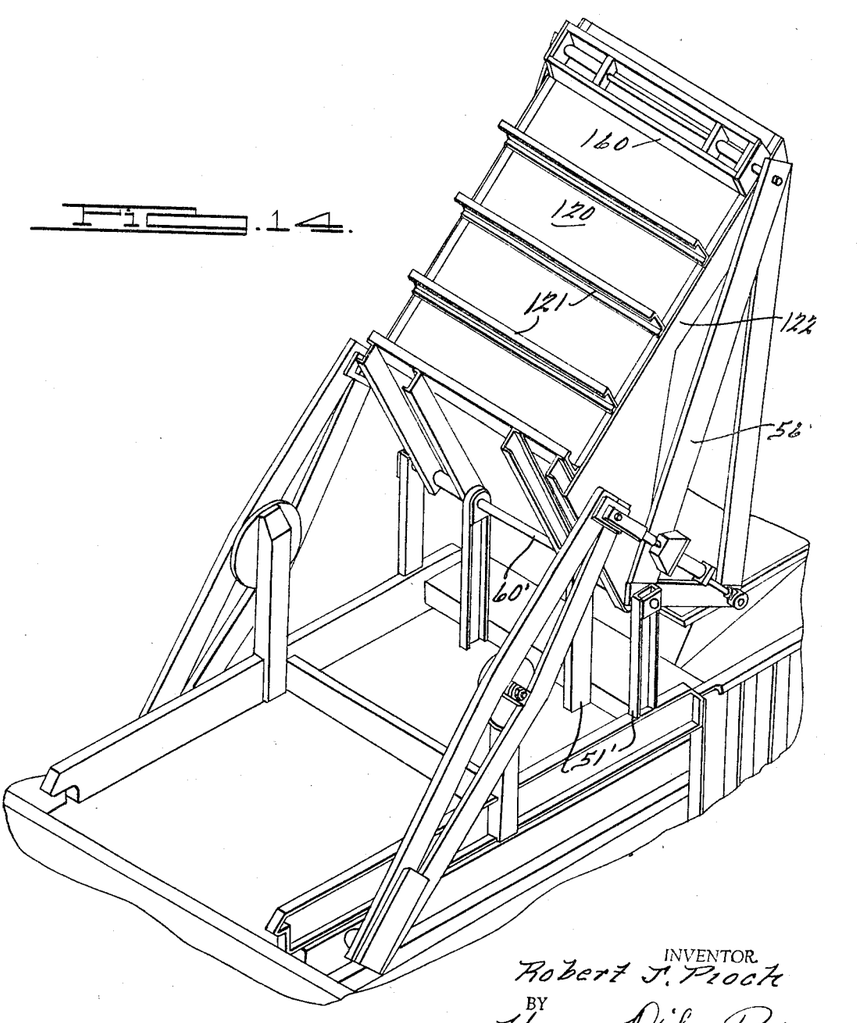
FIGURE 14 is a perspective view of the same in fully raised dumping position.

Means are provided whereby the platform may be selectively connected to and disconnected from the lifting arms 56' of the swinging lifting frame assemblies, such means being best illustrated in FIGURES 11 and 14. As brought out in FIGURE 14, a rigid transversely disposed box-like lock frame structure 160 secured to the bottom of the platform near the rear end thereof, carries a pair of slidably laterally projectible lock bolts formed as tapered-end pins 162, 163. Pins 162, 163 are supported for sliding movement in webs 164, 165, 166 of the lock frame structure 160. At its inner end lock pin 163 is connected to a hydraulic cylinder 168, while the inner end of the lock pin 162 is connected to a piston rod 170 which is in turn connected to a piston 172 in cylinder 168. When fluid is introduced into cylinder 168, the cylinder and piston are forced outwardly in opposite directions tending to project both of the locking pins 162, 163. A safety limit switch 174 which is electrically in the ram control circuit is carried by the cylinder 168 and is biased to a centered "off" position wherein the ram 24' cannot be actuated. In such centered position the actuating arm 177 of switch 174 extends downwardly vertically, as viewed in FIGURE 11. When actuated to and held at either the right or left, as shown in that view, the switch is on and the control circuit is thereby conditioned to permit actuation of the ram. The switch cannot be actuated to either position, however, except when both pins are either fully retracted or fully projected. When fully projected they extend into apertured portions 175 in the ends of the lifting arms 56'. When retracted they are free of both arms and the ram then can be actuated without lifting the platform. The actuating arm 177 of limit switch 174 is engageable, as the pins attain the fully projected position, by a cam 178 on a rod 180 secured to the piston rod 170 and extending beside and movable in a path parallel to the cylinder 168 when the piston and cylinder move with relation to each other. As the piston rod 170 and cylinder 168 move in the opposite direction to retract the pins, the switch opens to disable the ram before either pin is fully withdrawn from its lifting arm. During continuing movement of the cylinder and piston in the same direction the switch remains off until after a degree of movement has occurred insuring full retraction of both pins from both arms. Upon completion of such full retracting movement, another cam lobe 182 engages arm 177 and swings it to the right to actuate the switch and again condition the control circuit to permit actuation of the ram.

The supply of pressure fluid to the cylinder 168 is controlled by the same means which controls the supply of pressure fluid to the cyinlders 130 for the receptacle clamping hooks 125, and a single actuating means such as a valve actuatable by means of a gate for physically blocking access to the platform is preferably provided so that when actuated in one direction hydraulic fluid is supplied simultaneously to the cylinders 130 and to the cylinder 168 in such directions that the receptacle is clamped to the platform, and the pins 162, 163 are projected to lock the platform to the lifting arms, while when actuated in the opposite direction fluid is supplied to the opposite ends of all three such cylinders, to raise the clamping hooks and retract the pins. Switch 174 is actuated to the ram-conditioning position at both extremes of movement, as explained above.

The ram normally stands projected and it therefore first retracts, and during its retraction, if pins 162, 163 are engaged, lifts the platform from the position shown in FIGURE 13 to the raised and partly inverted position shown in FIGURE 14, which latter position is attained as the ram is fully retracted, thereby exposing the bin or chamber 22' beneath the hopper 20' so that the contents of the receptacle can fall into the space within the bin 22' ahead of the ram. The ram then moves forwardly to move the dumped contents forwardly into the desired container or destination and completes its cycle in the forward position as previously indicated. During such forward movement the lifting arms are returned to the lowered position of FIGURE 13. The receptacle may thereafter be freed and removed.

If the lift-dump mechanism is not being used, however, it will be seen that the platform floor 120 will remain down and permits access to the hopper by personnel carrying, wheeling or otherwise delivering material without danger of unwanted actuation of the platform, and the ram is actuatable at such times independently of the platform.

Figure 15:
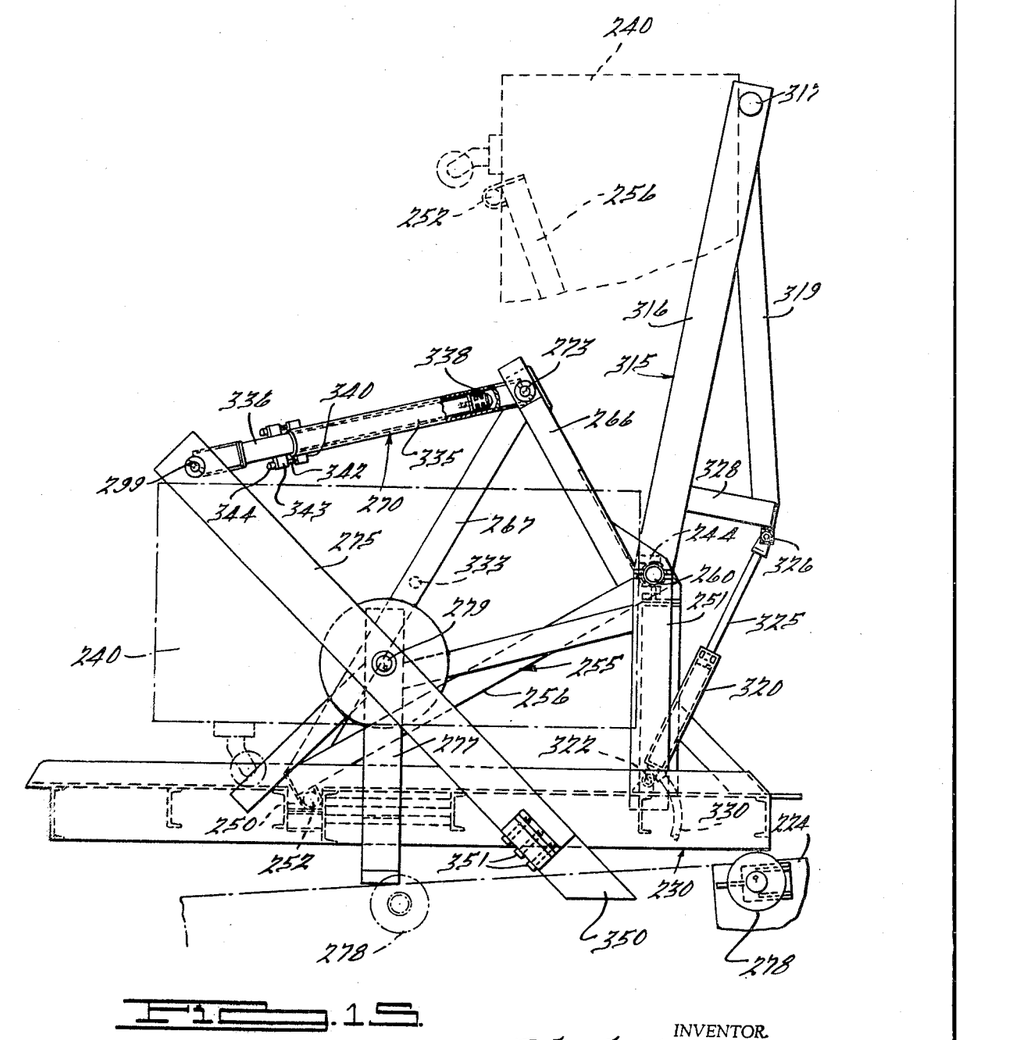
FIGURE 15 is a side elevational view similar to FIGURE 9 showing another modified construction.
Figure 16:
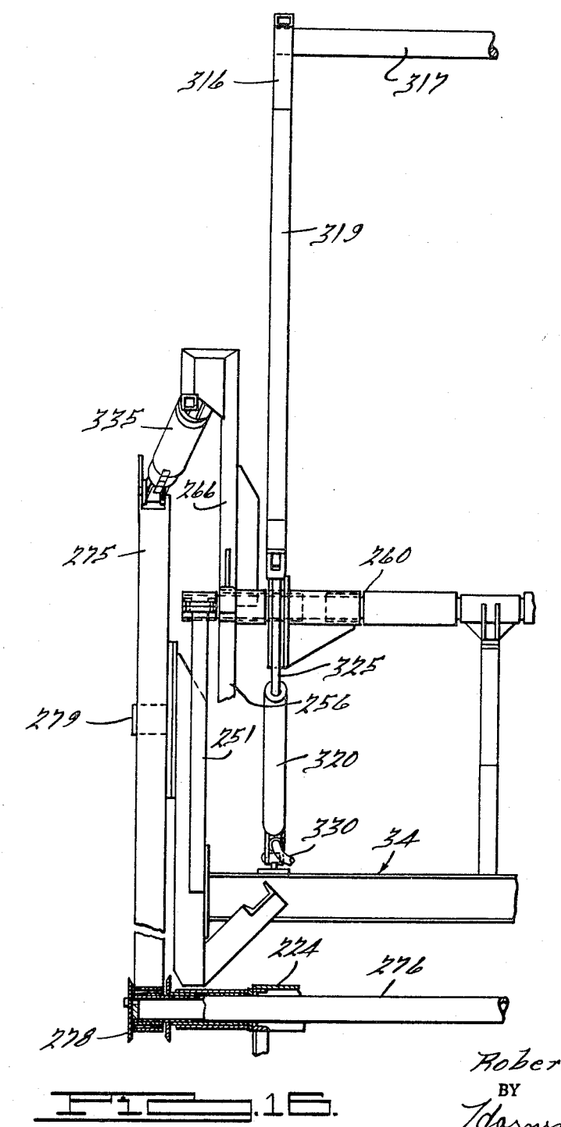
FIGURE 16 is a sectional elevational view taken substantially on the line XVI—XVI of FIGURE 15 and looking in the direction of the arrows.

In the further modification shown in FIGURES 15 and 16, parts corresponding to those of the first described embodiment are designated by like reference characters 200 integers high, and many of the parts will require no detailed redescription. The cart, shown in dot-dash lines at 240, is adapted to be lifted and swung to an inverted position by means of a bar 252 which is adapted to bear directly against the bottom, the bar being secured to and actuatable by main lifting arms 256 which form a part of main lifting bell crank assemblies 255, which are pivoted upon a shaft 260 similarly supported at the forward end of the assembly as by the upright frame structure 251. The main levers 275, shown as simple straight bars, are formed of rectangular-sectional tubing, similarly pivoted at each side of the assembly, as upon upright frame structure 277, and are connected to the bell crank assembly to actuate the same by link assemblies 270. The main levers are actuatable by rollers 278 carried by the rear upper corners of the ram 224 in similar fashion, but it will be noted that the rollers are not in interfitted or interlocking engagement with the lower ends of the main levers 275 as is the case with the corresponding portions of the previous embodiments. In fact when the ram 224 and roller 278 are all the way forward, in their normal rest positions shown in full lines in FIGURE 15, the roller is forward of the lower end of the main lever by a substantial distance, as shown in FIGURE 15. As the ram retracts, the rollers engage the forward lower portions of the main levers and push them to the rear, rocking the main levers and thereby the bell crank 255 clockwise, as viewed in FIGURE 15, and thereby actuating the lift bar 252 to raise and invert the receptacle or cart 240 so that it may discharge its contents into a hopper or other desired receiver (not shown).

Suitable abutment means 244 upon the front of the receptacle overengage the same bar 260 as serves to fulcrum the bell cranks 255 so that in this embodiment the receptacle 240 pivots about the same axis as does the lifting bar 252, no interlocking means being provided between the lifting bar and the receptacle.

The rearmost positioning of the rollers 278 is indicated in dotted lines at the lower left portion of FIGURE 15. It will be recognized that before the rearmost position is reached, the bell crank assemblies and the cart will be moved to an overbalanced position such that if the bar 252 constituted the only support for the receptacle 240, the receptacle would fall forwardly and downwardly into the receiver.

In order to restrain forward and downward movement of the receptacle under the force of gravity, and to return it after dumping, another orbitally swingable transverse bar 317 is provided which is adapted to engage the top of the receptacle slightly before the receptacle reaches an overbalanced position in its upward travel. The bar 317 is carried by a pair of side arms 316 which are also pivoted on the shaft 260. The arms 316 and bar 317 form a frame structure 315 which also includes forwardly extending arms 328 rigidly attached to the arms 316 and preferably also braced with respect thereto by angle braces 319. The side arms 316 are spaced apart a distance somewhat exceeding the width of the receptacles 240, but lie inside the other pivoted parts previously described.

Attached to the frame structure at a position appurtenant to the front frame structure 251 at each side is a hydraulic cylinder 320, one such cylinder being provided for each of the side arms 316 and in vertical alignment therewith. The bottom of each cylinder is connected by means including a transverse pivot pin 322 to the main frame structure 34. A hydraulically actuatable piston within the cylinder is connected by means of a piston rod 325 and a transverse articulating pin 326 to the arm 328. Hydraulic fluid is adapted to be supplied to the cylinders 320 through flexible conduit means as 350.

As the ram is being moved rearwardly to lift and invert the receptacle, hydraulic fluid is simultaneously supplied to the cylinders 320 under a pressure which is sufficient to prevent the receptacle from falling away from the lifting bar 252, but less than the pressure which actuates the ram 224, so that the movement of the ram and receptacle under the influence of and at the rate corresponding to ram movement are not arrested. The receptacle is thus kept from moving under the force of gravity. After dumping is completed and as the ram moves forwardly, the hydraulic pressure supplied to the cylinders, being sufficient to overcome the weight of the receptacle, is effective to lift and swing the receptacle from the dumped inverted position back to the position corresponding to that shown in dotted lines in FIGURE 15. At such position, the receptacle has again passed over center in the counterclockwise direction so that gravity tends to assist the return of the receptacle to the lowered position shown in dot-dash lines. When fully lowered, the bar 252 enters the trough 250 and the receptacle can be wheeled out.

In this embodiment each link assembly 270 incorporates cushioning means in the form of an axially compressible rubber buffer 338 trapped within the interior of telescopically slidably interfitted tubular link elements 335, 336. The degree of sliding movement of the tubular link elements 335, 336 is limited by bolt members 342 secured to lugs 340 attached as by welding to the outer tubular member 335 near the rear end thereof. The bolts extend longitudinally and slidably through lugs 343 attached to the inner tubular member 336, the heads 344 of the bolts overhanging the lugs 343 to limit sliding movement of the tubular members in a separating direction. The bolts 342 are of such length as to allow approximately one inch of sliding movement. The rubber cushioning member 338 yieldably holds the telescopable link members extended, but permits them to telescope inwardly to the limited extent indicated when the initial relatively rapid loading occurs at the commencement of the lifting action.

In order to permit operation of the compactor without actuating the lift-dump mechanism, the lower ends of the main levers 275 are formed as separable or removable portions 350 attached as by bolt means 351 to the main portions of the levers. The removable portions 350 are of such length that when they are removed the actuating rollers 278 will pass freely underneath the main levers without actuating them.

As is best brought out in the drawings of the first embodiment, with reference to FIGURES 1, 4, 5 and 9, the main levers as 75 and lever arms 66 are so positioned and so interconnected by the link assemblies that the transmission of power from the main levers to the links and from the links to the bell crank arms as 66 is highly efficient, highly favorable angles existing between these parts during those portions of their travel where maximum torque is required.

Figure 9:
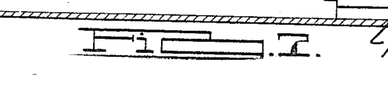
FIGURE 9 is a side elevational view of a modified form of the invention.

In the preferred embodiments shown, the main levers rock through an angle of approximately 110° between the initial position shown in FIGURES 1 and 9, and the fully dumped position represented by FIGURE 5, while the corresponding travel of the bell cranks 55 is approximately 140°. In the initial portion of the lifting movement of a loaded container, from the position of FIGURE 1 toward the position of FIGURE 4, the links are most nearly perpendicular to the lever arms, so that maximum torque is transmitted, while the less favorable angles of attack occur only after the load has been raised to a position such that the greatest component of the gravity load force is taken by the bar and frame structure 45–51, and after the load has been dumped.

In the embodiments incorporating the hydraulic link assemblies, when the ram 24 is in the fully projected or rest position, corresponding to FIGURES 1 and 9, the dashpot assemblies are extended, piston rods 71 being pulled out to the right, to the intended limit of their travel. If at such time there is a tightly packed load in the container 27, and the resiliency of the load creates a tendency for the load to re-expand, such force may push the ram back somewhat, during a rest period. Since the dashpot-link assemblies will bleed fluid through valves 101–102 during such a creep-back of the ram, however, the link assemblies will merely be contracted somewhat in length, without thereby lifting the bar 52 out of trough 50 (in the first embodiment) or lifting the platform 120 (second embodiment) from its proper lowered position.

When the ram is subsequently actuated, and starts back, the dashpot travel (or remainder of their travel) cushions the initial lifting of the load.

The link assemblies also extend to their full length when the load is inverted, as in FIGURE 5, to permit the final portion of the movement of the load to occur without requiring equivalent angular movement of the main levers.

In the embodiment of FIGURES 15–16, the ram, when fully projected, moves far enough forwardly away from the lever ends of main levers 275 so that if the ram is forced rearwardly during a rest period by re-expansion of a compacted load, the rollers 278 will not reach and rock the main levers so as to raise the lift bar 252 from its trough.

It will be understood that when reference is made to inverting of the receptacle, the meaning of such language in the specification and claims hereof is intended to encompass any sufficient tipping to effect discharge of the contents of the receptacle.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. Means for lifting and inverting a receptacle to enable dumping contents therefrom, comprising a fixed support, receptacle elevator means pivotally connected to said support for swinging about a fixed axis, means for releasably holding a receptacle in desired position with respect to said elevator means, actuating means including a portion drivably engageable with said elevator means at a position spaced from and on one side of said axis to lift the elevator means upwardly and over said axis to a position wherein the receptacle lies at least partly on the other side of said axis, said elevator means including a pair of laterally spaced side arm portions adapted to accommodate therebetween a receptacle to be dumped, actuating means for said elevator means comprising a pair of laterally spaced levers, one adjacent to each of said side arm portions, said levers being rockable about a common transverse horizontal axis spaced from the first mentioned axis and all of said levers and arms being rockable in parallel vertical planes, and a link connecting each lever to the adjacent side arm portion.

2. Means for lifting and inverting a receptacle to enable dumping contents therefrom, comprising a fixed support, receptacle elevator means comprising a pair of laterally spaced parallel side arm portions adapted to accommodate therebetween a receptacle to be dumped and swingable on said support in vertical planes about a common transverse horizontal axis located at their forward ends, receptacle positioning and holding means including a fulcrum portion about which a receptacle is swingable on said support about a transverse horizontal fulcrum axis, said positioning and holding means also including means for drivingly positioning a receptacle with respect to said side arm portions, actuating means for said side arm portions comprising a pair of levers one adjacent to each side arm portion and rockable in planes parallel thereto about another transverse axis spaced rearwardly from the first mentioned axis, means for drivingly interconnecting the levers to the side arm portions and means for making and breaking a driving connection through said interconnecting means to a receptacle on the elevator means.

3. Means for lifting and inverting a receptacle to enable dumping contents therefrom, comprising a fixed support, receptacle elevator means comprising a pair of laterally spaced parallel side arm portions adapted to accommodate therebetween a receptacle to be dumped and swingable on said support in vertical planes about a common transverse horizontal axis located at their forward ends and extending downwardly and rearwardly from such axis, receptacle positioning and holding means including a fulcrum portion about which a receptacle is swingable on said support about a transverse horizontal fulcrum axis, said positioning and holding means also including means for drivingly positioning a receptacle with respect to said side arm portions, actuating means for said side arm portions comprising a pair of levers one adjacent to each side arm portion and rockable in planes parallel thereto about another transverse axis spaced rearwardly from the first mentioned axis, and means for drivingly interconnecting the levers to the side arm portions.

4. Means for lifting and inverting a receptacle to enable dumping contents therefrom, comprising a fixed support, receptacle elevator means comprising a pair of laterally spaced parallel side arm portions adapted to accommodate therebetween a receptacle to be dumped and swingable on said support in vertical planes about a common transverse horizontal axis located at their forward ends, receptacle positioning and holding means including a fulcrum portion about which a receptacle is swingable on said support about a transverse horizontal fulcrum axis, said positioning and holding means also including means for drivingly positioning a receptacle with respect to said side arm portions, actuating means for said side arm portions comprising a pair of levers one adjacent to each side arm portion and rockable in planes parallel thereto, means for drivingly interconnecting the levers to the side arm portions, said elevator means comprising a pair of bell cranks, one arm of each of said bell cranks being defined by one of said side arm portions, and the other arm of each bell crank being connectable to one of the levers through said means for drivingly interconnecting the levers and side arm portions.

5. Means for lifting and inverting a receptacle to enable dumping contents therefrom, comprising a fixed support, receptacle elevator means comprising a pair of laterally spaced parallel side arm portions adapted to accommodate therebetween a receptacle to be dumped and swingable on said support in vertical planes about a common transverse horizontal axis located at their forward ends, receptacle positioning and holding means including a fulcrum portion about which a receptacle is swingable on said support about a transverse horizontal fulcrum axis, said positioning and holding means also including means for drivingly positioning a receptacle with respect to said side arm portions, actuating means for said side arm portions comprising a pair of levers one adjacent to each side arm portion and rockable in planes parallel thereto, means for drivingly interconnecting the levers to the side arm portions, said elevator means comprising a pair of bell cranks, one arm of each of said bell cranks being defined by one of said side arm portions, and the other arm of each bell crank being connectable to one of the levers through said means for drivingly interconnecting the levers and side arm portions, said last mentioned interconnecting means comprising links, and longitudinally yieldable cushioning means in said links.

6. Means for lifting and inverting a receptacle to enable dumping contents therefrom, comprising a fixed support, receptacle elevator means comprising a pair of laterally spaced parallel side arm portions adapted to accommodate therebetween a receptacle to be dumped and swingable on said support in vertical planes about a common transverse horizontal axis located at their forward ends, receptacle positioning and holding means including a fulcrum portion about which a receptacle is swingable on said support about a transverse horizontal fulcrum axis, said positioning and holding means also including means for drivingly positioning a receptacle with respect to said side arm portions, actuating means for said side arm portions comprising a pair of levers one adjacent to each side arm portion and rockable in planes parallel thereto, means drivingly interconnecting the levers to the side arm portions, said lever being of the first order, alike in size and parallel to one another and on coaxial fulcra, the means for drivingly interconnecting the levers and side arm portions comprising a pair of links each of which is connected to one extremity of one arm of one of said levers, and means for driving the other arms of said levers.

7. Means for lifting and inverting a receptacle to enable dumping contents therefrom, comprising a fixed support, receptacle elevator means comprising a pair of laterally spaced parallel side arm portions adapted to accommodate therebetween a receptacle to be dumped and swingable on said support in vertical planes about a common transverse horizontal axis located at their forward ends, receptacle positioning and holding means including a fulcrum portion about which a receptacle is swingable on said support about a transverse horizontal fulcrum axis, said positioning and holding means also including means for drivingly positioning a receptacle with respect to said side arm portions, actuating means for said side arm portions comprising a pair of levers one adjacent to each side arm portion and rockable in planes parallel thereto, means drivingly interconnecting the levers to the side arm portions, said levers being of the first order, alike in size and parallel to one another and on coaxial fulcra, the means for drivingly interconnecting the levers and side arm portions comprising a pair of links each of which is connected to one extremity of one arm of one of said levers, and means including a slide portion for driving the other arms of said levers.

8. Means as defined in claim 4 wherein said levers are of the first order, are alike in size and parallel to one another and are on coaxial fulcra, the means for drivingly interconnecting the levers and side arm portions comprising a pair of links each of which is connected at its one end to one extremity of one arm of one of said levers, the other end of each link being connected to said other arm of one of the bell cranks.

9. Means for lifting and inverting a receptacle to enable dumping contents therefrom, comprising a fixed support, receptacle elevator means pivotally connected to said support for swinging about a fixed transverse horizontal axis, receptacle positioning and holding means including a fulcruming portion pivotally connectable to said support for guiding the receptacle about a transverse horizontal fulcrum axis, said receptacle positioning and holding means also including a holding portion for restraining unwanted separation of the receptacle from the elevator means, defining an initial position for said elevator means below and on one side of said axis, and means defining a raised dumping position for said elevator means above and on the other side of said axis, said first mentioned axis and fulcrum axis being parallel and vertically spaced with respect to each other, said fastening portion including a part engageable and disengageable by differential movement between a portion of the elevator means spaced from the first axis and a part of said receptacle positioning and holding means spaced from said fulcrum axis.

10. Means for lifting and inverting a receptacle to enable dumping contents therefrom, comprising a fixed support, receptacle elevator means comprising a pair of laterally spaced parallel side arm portions adapted to accommodate therebetween a receptacle to be dumped and swingable on said support in vertical plans about a common transverse horizontal axis located at their forward ends, receptacle positioning and holding means including a fulcrum portion about which a receptacle is swingable on said support about a transverse horizontal fulcrum axis, said positioning and holding means also including means for drivingly positioning a receptacle with respect to said side arm portions, actuating means for said side arm portions comprising a pair of levers one adjacent to each side arm portion and rockable in planes parallel thereto about another transverse axis spaced rearwardly from the first mentioned axis, means for drivingly interconnecting the levers to the side arm portions and means for making and breaking a driving connection through said interconnecting means to a receptacle on the elevator means, said means for making and breaking a driving connection comprising a pair of lock members actuatable to locked and unlocked positions to respectively connect and disconnect the receptacle positioning and holding means with respect to said side arm portions, driving means for said levers, means for actuating said lock members to said positions, and means responsive to movement of either of said members away from either of said positions for disabling said driving means.

11. Means for lifting and inverting a receptacle to enable dumping contents therefrom, comprising in combination with a receptacle having front and rear portions, pivotable portions carried by a front portion of the receptacle on a transverse axis, supporting means having front and rear portions and upon which the receptacle is adapted to be positioned, fulcruming portions carried by the front portion of the supporting means for coaction with the aforementioned pivotable portions and defining a transverse tipping axis, lifting means comprising a pair of arms carried by and swingable about a transverse axis near the front of the supporting means, portions actuatable by the lifting means and engageable with a rear portion of the receptacle to lift the same upwardly and forwardly around said tipping axis and thence over and downwardly thereabout to a dumping position, fastening means operatively engageable with said receptacle to effect a two way driving engagement between said arms and receptacle in both angular directions about said tipping axis, and being disengageable from the receptacle, and means for actuating said arms and said fastening means.

12. Means for lifting and inverting a receptacle to enable dumping contents therefrom, comprising a fixed support having front and rear portions and upon which a receptacle is adapted to be positioned, fulcruming portions carried by the front of the support and defining a transverse tipping axis about which the receptacle is adapted to be swung in a vertical plane, lifting means comprising a pair of transversely spaced side arm members swingable about a transverse fulcrum axis carried by and at the front of the support and extending rearwardly on either side of the receptacle and operatively connectable with the receptacle at a position spaced from the front of the support to lift the receptacle upwardly and forwardly around said tipping axis to a dumping position, means opposing separation of the receptacle from the lifting means, driving means for said lifting means, said means opposing separation of the receptacle from the lifting means comprising a holding element also pivoted on a transverse axis at the front of said support and engageable by an upper rear portion of the receptacle, and means opposing pivotal movement of the holding element in the angular direction corresponding to upward and forward movement of the receptacle.

13. Means as defined in claim 12 in which all three of said axes are coaxial and the lifting means and holding element are swingable thereabout independently of each other, said holding element and opposing means reacting against the receptacle and also against the lifting means and driving means.

14. Means for lifting and inverting a receptacle to enable dumping contents therefrom, comprising a fixed support having front and rear portions and upon which a receptacle is adapted to be positioned, fulcruming portions carried by the front of the support and defining a transverse tipping axis about which the receptacle is adapted to be swung in a verticle plane, lifting means comprising a pair of transversely spaced side arm members swingable about a transverse fulcrum axis carried by and at the front of the support and extending rearwardly on either side of the receptacle and operatively connectable with the receptacle at a position spaced from the front of the support to lift the receptacle upwardly and forwardly around said tipping axis to a dumping position, means opposing separation of the receptacle from the lifting means, the opposing means reacting against the receptacle during a portion only of the swinging movement thereof.

15. Means for lifting and inverting a receptacle to enable dumping contents therefrom, comprising a fixed support having front and rear portions and upon which a receptacle is adapted to be positioned, fulcruming portions carried by the front of the support and defining a transverse tipping axis about which the receptacle is adapted to be swung in a vertical plane, lifting means comprising a pair of transversely spaced side arm members swingable about a transverse fulcrum axis carried by and at the front of the support and extending rearwardly on either side of the receptacle and operatively connectable with the receptacle at a position spaced from the front of the support to lift the receptacle upwardly and forwardly around said tipping axis to a dumping position, means opposing separation of the receptacle from the lifting means, the opposing means comprising a resiliently acting element urging said lifting means in an angular direction corresponding to downward return movement of the receptacle.

16. Means for lifting and inverting a receptacle to enable dumping contents therefrom, comprising a fixed support having front and rear portions and upon which a receptacle is adapted to be positioned, fulcruming portions carried by the front of the support and defining a transverse tipping axis about which the receptacle is adapted to be swung in a vertical plane, lifting means comprising a pair of transversely spaced side arm members swingable about a transverse fulcrum axis carried by and at the front of the support and extending rearwardly on either side of the receptacle and operatively connectable with the receptacle at a position spaced from the front of the support to lift the receptacle upwardly and forwardly around said tipping axis to a dumping position, means opposing separation of the receptacle from the lifting means, the opposing means comprising a resiliently acting hydraulic motor element urging said lifting means in an angular direction corresponding to downward return movement of the receptacle.

17. Means as defined in claim 16 including driving means for swinging said lifting means and a receptacle carried thereby upwardly from a lowered initial position to a raised and tilted position and thence overcenter to a tipped dumping position, said opposing means reacting against the receptacle during less than all of that portion of the swinging travel between said initial position and the overcenter position, but urging the receptacle toward the side of said overcenter position which is nearer to said initial position.

References Cited by the Examiner

UNITED STATES PATENTS

| | | | |
|---|---|---|---|
| 1,700,693 | 1/1929 | Biles. | |
| 2,351,731 | 6/1944 | Abbott | 214—314 |
| 3,107,797 | 10/1963 | McFeaters et al. | 214—314 X |
| 3,142,397 | 7/1964 | Felts | 214—302 |

FOREIGN PATENTS

| | | |
|---|---|---|
| 365,971 | 12/1922 | Germany. |
| 898,864 | 6/1962 | Great Britain. |

HUGO O. SCHULZ, *Primary Examiner.*